United States Patent
Epstein

(10) Patent No.: US 7,231,770 B2
(45) Date of Patent: Jun. 19, 2007

(54) ONBOARD SUPPLEMENTAL POWER SYSTEM AT VARYING HIGH ALTITUDES

(75) Inventor: Stanley W. Epstein, Van Nuys, CA (US)

(73) Assignee: Steward-Davis International, Inc., Van Nuys, CA (US)

( * ) Notice: Subject to any disclaimer, the term of this patent is extended or adjusted under 35 U.S.C. 154(b) by 0 days.

(21) Appl. No.: 11/427,058

(22) Filed: Jun. 28, 2006

(65) Prior Publication Data

US 2007/0068171 A1    Mar. 29, 2007

Related U.S. Application Data

(63) Continuation of application No. 10/896,309, filed on Jul. 21, 2004, now Pat. No. 7,111,462.

(51) Int. Cl.
*F02C 3/04* (2006.01)
*F02C 7/00* (2006.01)

(52) U.S. Cl. ........................ 60/792; 60/39.25

(58) Field of Classification Search ............ 60/39.163, 60/39.17, 39.25, 269, 726, 728, 791, 792
See application file for complete search history.

(56) References Cited

U.S. PATENT DOCUMENTS

| | | | |
|---|---|---|---|
| 2,920,843 A * | 1/1960 | Ferri | 60/224 |
| 3,167,954 A * | 2/1965 | Le May et al. | 73/168 |
| 3,548,597 A * | 12/1970 | Etessam | 60/226.3 |
| 3,764,814 A * | 10/1973 | Griffith | 60/791 |
| 4,438,625 A | 3/1984 | Rice | |
| 4,592,204 A | 6/1986 | Rice | |
| 4,751,814 A | 6/1988 | Farrell | |
| 4,813,227 A | 3/1989 | Rice | |
| 4,896,499 A | 1/1990 | Rice | |
| 4,949,544 A | 8/1990 | Hines | |
| 5,119,624 A | 6/1992 | McKenna | |
| 5,133,180 A | 7/1992 | Horner et al. | |
| 5,182,904 A | 2/1993 | Coplin | |
| 5,261,225 A | 11/1993 | Dickinson | |
| 5,323,603 A | 6/1994 | Malohn | |
| 5,386,687 A | 2/1995 | Frutschi | |
| 5,485,719 A | 1/1996 | Wulf | |
| 5,490,377 A | 2/1996 | Janes | |
| 5,535,584 A | 7/1996 | Janes | |
| 5,581,997 A | 12/1996 | Janes | |
| 5,778,675 A | 7/1998 | Nakhamkin | |
| 5,906,094 A | 5/1999 | Yang et al. | |
| 6,050,080 A | 4/2000 | Horner | |
| 6,050,082 A | 4/2000 | Leonard et al. | |
| 6,134,876 A | 10/2000 | Hines et al. | |
| 6,134,880 A | 10/2000 | Yoshinaka | |
| 6,141,953 A | 11/2000 | Mongia et al. | |
| 6,336,316 B1 | 1/2002 | Fujii et al. | |
| 6,367,241 B1 | 4/2002 | Ress, Jr. et al. | |

(Continued)

*Primary Examiner*—L. J. Casaregola
(74) *Attorney, Agent, or Firm*—Craig Gelfound; McDermott Will & Emery LLP

(57) ABSTRACT

Systems and methods for supplementing a power system to achieve consistent operation at varying altitudes are disclosed herein. A hybrid power system comprising a single power source driving multiple generators may implement a power recovery turbine to drive a supercharger compressor, which may provide compressed air at increased altitudes. The supplemental power system disclosed herein provides necessary shaft horsepower at high altitudes to drive a generator and produce cooling air.

16 Claims, 3 Drawing Sheets

U.S. PATENT DOCUMENTS

| | | |
|---|---|---|
| 6,378,287 B2 | 4/2002 | Griffiths |
| 6,392,313 B1 | 5/2002 | Epstein et al. |
| 6,397,575 B2 | 6/2002 | Tomlinson et al. |
| 6,530,224 B1 | 3/2003 | Conchieri |
| 6,606,864 B2 | 8/2003 | MacKay |
| 6,651,421 B2 | 11/2003 | Coleman et al. |
| 6,865,891 B2 * | 3/2005 | Walsh et al. ............... 60/39.25 |
| 2002/0078689 A1 | 6/2002 | Coleman et al. |
| 2003/0192304 A1 | 10/2003 | Paul |
| 2003/0221409 A1 | 12/2003 | McGowan |

* cited by examiner

ONBOARD SUPPLEMENTAL POWER SYSTEM AT VARYING HIGH ALTITUDES

CROSS-REFERENCE TO RELATED APPLICATIONS

This application is a continuation of patent application Ser. No. 10/896,309, filed Jul. 21, 2004 now U.S. Pat. No. 7,111,462.

STATEMENT REGARDING FEDERALLY SPONSORED RESEARCH OR DEVELOPMENT

The U.S. Government has a paid-up license in this invention as provided for by the terms of contract No. F33615-03-2367 awarded by USAF/AFMC.

BACKGROUND

1. Field

The present disclosures herein relate to aircraft engines, and more specifically to systems and techniques for augmenting the power capability of aircraft engines in high altitude environments.

2. Background

Ongoing development and growth in the area of onboard aircraft electrical systems and electronic sub-systems has resulted in a desire to augment existing aircraft systems with supplemental electrical generating capability. However, standard aircraft production-design characteristics generally leave little, if any, room for significant electrical or cooling air systems expansion or modification. Thus, it is difficult for aircraft to accommodate post-production systems additions. The traditional approach of original equipment manufacturers with respect to expanding on-board power and electrical generating capability usually leads to extensive and costly aircraft and/or engine modifications.

Aircraft are often powered by gas turbine engines, which have a great power-to-weight ratio compared to internal combustion reciprocating engines. Gas turbine engines are commonly considered to be "over-powered" at low altitudes, because of their high power-to-weight ratio. However, at high altitude, when the air gets thinner, air-breathing internal combustion engines lose power. Even gas turbine engines can quickly become "under-powered" as an aircraft ascends. Unfortunately, power enhancement modifications to an aircraft engine often require costly structural alterations to the airframe itself. Thus, in addition to the main engines, aircraft often utilize additional small gas turbine engines that may be installed within the aircraft. These additional engines may generate electric power and provide pressurized air for power requirements while the aircraft is on the ground. Generally, these devices have their functions taken over in flight by the main engine. However, as electrical requirements for passenger amenities and other electronic needs have increased, these auxiliary power units have become correspondingly larger. In modern aircraft, auxiliary power units are often utilized in-flight. Although many auxiliary engines are now overpowered at sea level, they generally are only able to provide constant power up to altitudes of about 25,000 ft. ("FL25"), and have diminishing power as the increases beyond that. Gas turbine engines cannot easily be made any larger, as the increase in size and weight would require significant structural modification to the airframe itself.

In short, modern aircraft including military aircraft, which have high requirements for electrical power, suffer deficiencies when equipped with gas turbine engines, because they lose power at high altitude but cannot compensate with increased size due to airframe structural limitations. Thus, the in-flight power generating capability of aircraft is often significantly limited under prior art constructs. One result is that there is not currently a gas turbine power system capable of operating at high altitude with the ability to maintain the increasing demand for more horsepower to drive a generator and produce cooling air in sufficient quantity, without requiring significant modification to airframe structures.

SUMMARY

In one aspect of the present invention, a gas turbine power system for an aircraft includes a gas turbine engine having a sensor system configured to measure the air mass flow through the engine and an exhaust nozzle having a variable opening responsive to the sensor system, a power recovery turbine coupled to the variable opening in the gas turbine engine, a first compressor driven by the power recovery turbine and configured to deliver compressed air to the gas turbine engine, and a second compressor coupled to the gas turbine engine or the power recovery turbine.

In another aspect of the present invention, a method of regulating the power of a gas turbine power system installed on an aircraft includes measuring the air mass flow through a gas turbine engine having an air intake and an exhaust outlet, adjusting, as a function of the measured air mass flow, a variable opening nozzle coupled to the exhaust outlet of the gas turbine engine, directing exhaust from the gas turbine engine through the adjusted variable opening nozzle, driving a power recovery turbine with the exhaust, driving a first compressor with the power recovery turbine and routing compressed air generated by the first compressor to the air inlet of the gas turbine engine, and driving a second compressor with the gas turbine engine or the power recovery turbine.

In another aspect of the present invention, a gas turbine power system for an aircraft includes means for measuring the air mass flow through a gas turbine engine, means, responsive to the means for measuring, for variably opening an exhaust nozzle coupled to the gas turbine engine, means, coupled to the exhaust nozzle, for driving a first compressor, means for delivering a first portion of compressed air from the first compressor to the gas turbine engine, and means, coupled to the gas turbine engine or the means for driving the first compressor, for further compressing a second portion of the compressed air and routing it to an air conditioning system.

It is understood that other embodiments of the specific teachings herein will become readily apparent to those skilled in the art from the following detailed description, wherein it is shown and described only several embodiments of the teachings by way of illustration. As will be realized, the subject matter of the teachings herein is capable of other and different embodiments and its several details are capable of modification in various other respects, all without departing from the spirit and scope of these teachings. Accordingly, the drawings and detailed description are to be regarded as illustrative in nature and not as restrictive.

BRIEF DESCRIPTION OF THE DRAWINGS

Aspects of the disclosures herein are illustrated by way of example, and not by way of limitation, in the accompanying drawings, wherein.

DETAILED DESCRIPTION

Figure 1:
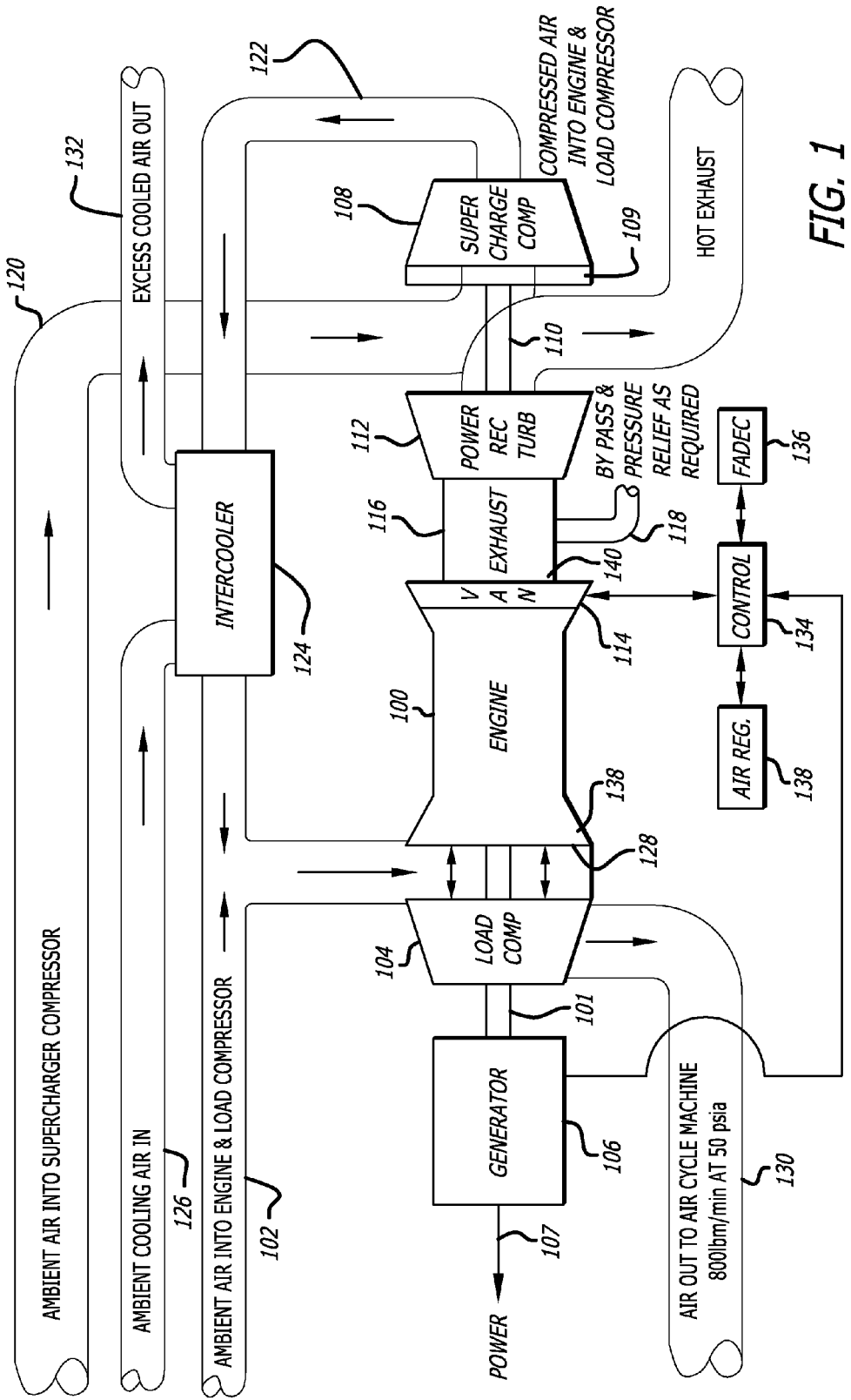
FIG. 1 is a schematic illustrating an exemplary system layout design.

The detailed description set forth below in connection with the appended drawings is intended as a description of various embodiments of the teachings herein and is not intended to represent the only embodiments in which the teachings herein may be practiced. The term "exemplary" used throughout this disclosure means "serving as an example, instance, or illustration," and should not necessarily be construed as preferred or advantageous over other embodiments. The detailed description includes specific details for the purpose of providing a thorough understanding of the teachings. However, it will be apparent to those skilled in the art that the teachings herein may be practiced without these specific details. In some instances, well-known structures and devices are shown in block diagram form in order to avoid obscuring the concepts of the teachings herein. Acronyms and other descriptive terminology may be used merely for convenience and clarity and are not intended to limit the scope of the teachings herein. The term "coupled" is used throughout this disclosure to indicate structural or functional cooperation between two components. In the case of structural cooperation, the components may be connected directly to one another or, where appropriate in the context, connected indirectly to one another, e.g., through intervening or intermediary devices or other means. In the case of functional cooperation, there may or may not be a physical connection between the two components.

In the following detailed description, various aspects of the teachings herein will be described in the context of a gas turbine engine that may comprise a commercially available off the shelf gas turbine engine. While these inventive aspects may be well suited for use with such an engine, those skilled in the art will readily appreciate that they are likewise applicable for use in various other exhaust-producing aircraft engines. Accordingly, any reference to a gas turbine engine is intended only to illustrate various aspects of the disclosures herein, with the understanding that such aspects have a wide range of applications.

The teachings herein apply to aircraft gas turbine engine, to augment its power capability so that it may produce sufficient power to run a generator and cooling systems for power and cooling demands of the aircraft at high altitudes. In an exemplary embodiment, certain modifications may be made to a gas turbine engine in order to increase its power. For example, a supercharger may be utilized to boost the pressure of ambient air at high altitudes and deliver the pressurized air to the gas turbine engine's air intake. Implementing the supercharger would maintain atmospheric pressure at the air intake of the gas turbine engine, enabling the engine to provide sufficient power to drive onboard electrical and cooling systems even as the aircraft flies at high altitudes.

Generally speaking, supercharging may be used to force compressed air into a gas turbine engine to achieve improved engine performance and fuel efficiency. The supercharger may be driven by a power recovery turbine, which in turn may be driven by exhaust gases from the gas turbine engine. The increase in air fed into the gas turbine engine by the supercharger may increase combustion force and power. This increase may compensate for thinner air at high altitudes, and prevent the engine from losing power as the aircraft climbs. The stabilized power produced by the gas turbine engine may be directed through an output shaft to drive rotors, compressors, ducted fans, or for any other intended use the system designer may have for such power. In accordance with the teachings herein, one or more superchargers may be driven by the gas turbine engine exhaust, or coupled to the power output shaft of the gas turbine engine itself. These general concepts will be explained in further detail below.

FIG. 1 is an schematic illustrating an exemplary supplemental power system installation that may be used, for example, on aircraft. The exemplary supplemental power system may provide an aircraft with electrical power and compressed air for continuous ground and airborne operations. For example, it may provide for conditioning of the aircraft cockpit and passenger/cargo cabin areas, main engine starting and other electrical power requirements, at sea level and at high altitudes up to and beyond 40,000 feet ("FL40"). The exemplary supplemental power system may provide constant mass flow, variable inlet volumetric flow, and a variable compression ratio. That is, as the altitude of an aircraft increases, the exemplary supplemental power system may increasingly compress additional amounts of air, and feed this additional volume of compressed air to the air intake of the aircraft's gas turbine engine. As the aircraft increases altitude and encounters thinner air, the variably increased volumetric flow of air through the gas turbine engine will enable the gas turbine engine to experience a constant flow of pounds of air ("air mass flow"). In other words, larger amounts of compressed air at higher altitudes, where the air is thinner (i.e. has smaller mass), will approximate the air mass flow of smaller amounts of uncompressed (ambient pressure) air at lower altitudes, where the air is thicker (i.e. has larger mass). Thus, a gas turbine engine processing a greater volumetric flow of air at high altitudes may generate the same level of power as if it were processing a smaller volumetric flow of air at seal level, because it would actually be processing the same "air mass flow" in each case.

In an exemplary embodiment, a gas turbine engine 100 may include a compressor, a combustion area and a turbine. The compressor (not shown) may be located near the air intake of the gas turbine engine 100 and raise the pressure of incoming air to produce pressurized air. The high pressure air may then enter the combustion area (not shown), where fuel injectors may inject a stream of fuel, such as jet fuel in the case of an aircraft. In the combustion area, the air and fuel are mixed. The combustion area burns the fuel and produces exhaust, which may provide both power for use on board the aircraft, and thrust to cause the aircraft to move. The turbine (not shown) may be used to transmit power to other systems on the aircraft, by driving an output shaft 101. The turbine may include a set of vanes placed in the exhaust stream, that "catch" the exhaust and cause the vanes to spin, like a windmill. The vanes may be attached to the output shaft, which will spin as the vanes in the exhaust stream spin. The output shaft 101 may then be used to drive other systems on the aircraft. In this manner, the turbine extracts energy from the high pressure, high velocity exhaust that flows from the combustion chamber, and transmits the extracted energy through the output shaft 101. This energy may be used to provide power for electrical, cooling, and other systems on board the aircraft, that may be coupled directly or indirectly to the output shaft 101.

As mentioned above, in addition to producing power the gas turbine engine 100 may provide thrust for causing the aircraft to move forward. A nozzle may be formed at the exhaust end of the gas turbine engine, to generate a high speed jet of exhaust gas. This high speed exhaust jet may provide thrust that causes the aircraft to move forward. Therefore, the gas turbine engine 100 may provide both thrust to move the aircraft forward, and additional power for driving various electrical and cooling systems on board the aircraft. The gas turbine engine 100 may comprise a commercial off the shelf ("COTS") engine, as selected by a system designer. For example, the gas turbine engine 100 may comprise a Pratt & Whitney PW127G turbine engine, capable of producing approximately 2600–2800 shaft horsepower ("shp") at sea level static, standard day conditions. This is only one example of a gas turbine engine that may be utilized in the exemplary embodiment, and should not be read to limit the teachings herein. Those skilled in the art will recognize that any of a number of different engines may be used in conjunction with the teachings herein.

In accordance with the general principles disclosed herein, the gas turbine engine 100 may receive ambient air 102 at its air intake 128. The ambient air may be compressed, mixed with fuel, and combusted in the gas turbine engine 100, as explained above. The exhaust gases produced by the combusted fuel-air mixture may be used to rotate the output shaft 101. The output shaft 101 of the gas turbine engine 100 may drive a power generator 106 that produces power as indicated at arrow 107. Alternatively, the power generator 106 may be driven by a separate, power recovery turbine, as will be explained in further detail below. The power generator 106 may comprise a 1000 kilivolt ampere ("KVA") generator, or any other generator that may be required to support various electrical, cooling, and other systems on board an aircraft to be fitted with the exemplary supplemental power system.

To enable it to provide sufficient power to drive generator 106 at high altitude, the gas turbine engine 100 may be supercharged. A power recovery turbine 112 coupled to the output of the gas turbine engine 100, either directly or indirectly, may be used to drive a supercharger compressor 108. The power recovery turbine 112 may be coupled to a variable area nozzle ("VAN") 114 at the exhaust outlet of the gas turbine engine 100. The VAN 114 may be opened or closed to change the size of the nozzle through which exhaust from the gas turbine engine 100 may be discharged. As the VAN 114 is opened, the nozzle area becomes larger, allowing exhaust to escape more easily. As the VAN 114 is closed, the nozzle area becomes smaller, partially blocking the path of exhaust from the gas turbine engine 100. Thus, closing or partially closing the VAN 114 will increase backpressure at the exhaust outlet of the gas turbine engine 100.

An exhaust duct 116, coupled to the exhaust outlet of the gas turbine engine 100, may include a bypass duct 118 for pressure relief. When the gas turbine engine 100 does not need to be supercharged in order to support the aircraft's on board systems, such as at lower altitudes, exhaust from the gas turbine engine 100 may pass through bypass duct 118. However, when additional power is required, such as at higher altitudes, exhaust may be directed past the bypass duct 118 and through the power recovery turbine 112. This re-direction of exhaust may be accomplished, for example, by closing or partially closing the VAN 114 and increasing the backpressure at the exhaust outlet of the gas turbine engine 100. The details regarding how this may be accomplished will be explained in further detail below. In any case, as exhaust flows through the power recovery turbine 112, it may rotate the power recovery turbine 112 having an output shaft 110 attached thereto. The output shaft 110 may be used to drive the supercharger compressor 108, which may supercharge the gas turbine engine 100. Supercharging the gas turbine engine 100 involves feeding additional volumes of air to the air intake 128 of the gas turbine engine 100. This may sustain the level of air mass flow through the gas turbine engine and thus the power produced by the gas turbine engine 100, even at the aircraft climbs to higher altitudes where the ambient air is thinner.

The supercharger compressor 108 may be either axial flow or radial, and may be a low-pressure compressor (LPC) which can be sized to produce additional volumes of air to supply air flowing either directly to air conditioning equipment or to another compressor for other cooling systems on board the aircraft. The supercharger compressor 108 may include inlet guide vanes ("IGV") 109 to regulate the amount of ambient air 120 air that enters. The supercharger compressor 108 may compress the ambient air 120, which results in compressed air 122. The compressed air 122 may pass through an intercooler 124, which may cool the compressed air 122 as well as ambient air 126. This cooled air may be used to supplement the air that is received by the gas turbine engine 100, as well as to support air conditioning and other cooling systems that may be on board the aircraft. Both applications will be explained in further detail below.

If the intercooler 124 generates cooled, compressed air in a quantity that exceeds system requirements imposed by the generator 106 and the air conditioning system, the excess air may be released at a bypass duct 132. However, the majority of cooled, compressed air produced by the intercooler 124 may be used for both the gas turbine engine 100 and the air conditioning or other cooling systems. Cooling the compressed air 122 before it reaches the air intake 128 of the gas turbine engine 100 may preserve or increase the air mass flow of this compressed air 122. Generally speaking, when air is compressed, such as by the supercharger compressor 108, its temperature rises. If some or all of the air taken into a gas turbine engine has been supercharged, the benefit of supercharging (i.e. greater mass flow) may be reduced by this temperature rise. Thus, a cooling device such as the intercooler 124 may be employed to reduce the temperature of the supercharged air and preserve the greater air mass flow. Cooled air from the intercooler 124 may then be directed to the air intake 128 of the gas turbine engine 100. The gas turbine engine 100 may thus receive both the ambient air 102 and the additional cooled air from the intercooler 124. This additional amount of air from the intercooler 124 may increase pressure at the air intake 128, until it approximates the backpressure at the exhaust outlet of the gas turbine engine 100. Thus, if the backpressure had previously been increased, such as by closing or partially closing the VAN 114, the additional air supplied to the gas turbine engine 100 via supercharging may cause an equivalent increase in pressure at the air intake 128.

In accordance with the teachings above, if the backpressure is adjusted, such as to approximate the typical backpressure that would be present at sea level conditions, the exemplary supplemental power system may be engaged as described above to increase the pressure at the air intake 128 so that it also approximates the typical air intake pressure that would be present at sea level conditions. By repeating this process of controlling the VAN 114 to increase backpressure at the exhaust 116, then driving the supercharger compressor to feed more air into the air intake 128 and raise the pressure at the air intake 128, the gas turbine engine 100 will be able to process a consistent air mass flow and produce a consistent level of power, even as altitude increases and the ambient air 102 becomes thinner. Further, this consistent air mass flow may be controlled such that it is approximately what the gas turbine engine 100 would experience at sea level, causing the gas turbine engine to operate at full-powered sea level conditions, even at high altitudes.

In addition to supplementing the air intake of the gas turbine engine 100, cooled air from the intercooler 118 may be directed to a load compressor 104 that supports air conditioning and other cooling systems on board the aircraft. The load compressor 104 may produce compressed, cooled air 130 that may be used, for example, in on-board air conditioning, component cooling, or other types of conditioning systems that may be on board the aircraft. In an exemplary embodiment, the compressed, cooled air 130 may be approximately 800 pounds per minute, at 50 pounds per square inch absolute ("psia"). However, it will be recognized by those skilled in the art that exact specifications may be altered in accordance with the present teachings and tailored to fit the requirements of cooling systems on board various aircraft, as necessary.

The effect of supplying the gas turbine engine 100 with additional air from supercharger compressor 108 as described above, as well as mechanisms for controlling the amount of additional air, will now be explained. As illustrated in FIG. 1 and described in reference thereto, the exemplary supplemental power system may utilize the residual power obtained from captured gas turbine engine exhaust to compress ambient air. The compressed air results in an increased volume of air, which may be used to preserve the air mass flow processed by the gas turbine engine 100 at increased altitudes, for example, where ambient air is thinner. This additional air may compensate for the lower air-weight volume ratios that occur at high attitude, which would otherwise reduce the power capabilities of gas turbine engine 100 when an aircraft flies at higher altitudes. Preserving the air mass flow as altitude increases may enable the gas turbine engine 100 to generate a consistent level of power, even as the aircraft climbs. The air mass flow may be preserved by controlling the compressed air that is fed to the gas turbine engine 100, such that the gas turbine engine 100 receives air at a weight equal to that which it would receive at sea level.

A control system 134 may regulate the amount of compressed air that is fed to the air intake 128 of the gas turbine engine 100, such that it receives an approximately consistent air mass flow between sea level and higher altitudes. The control system 134 may rely on a buildup of backpressure in the gas turbine engine 100 in order to produce sea level output even at high altitudes up to at least 40,000 feet ("FL40"). Pressure may be monitored by one or more sensors, such as an intake sensor 138 located at the air intake 128 of the gas turbine engine 100, and an exhaust sensor 140 located in the exhaust duct 116 adjacent to the variable area nozzle 114. The intake sensor 138 may include a plurality of sensors, and the exhaust sensor 140 may also include a plurality of sensors. The sensors may be pressure sensors or other appropriate sensors for measuring or determining the pressure at various areas within and around the gas turbine engine 100 in order to measure the mass air flow through the gas turbine engine 100. The control system 134 may receive input from the pressure sensors 138 and 140, as well as other input signals that will be described below, and correspondingly control the VAN 114 to regulate backpressure at the exhaust outlet of the gas turbine engine 100.

The control system 134 may operate in conjunction with an aircraft's Full Authority Digital Engine Control ("FADEC") 136 and a cooling air demand regulating system 138. The FADEC 136 may control the outputs of the gas turbine engine 100 and power recovery turbine 112 as the aircraft is climbing through to FL40. The FADEC may, after receiving readings from an altimeter or other altitude sensing device, provide altitude information to the control system 134. The FADEC may also provide information to the control system 134 regarding the power requirements of various systems on board the aircraft any a given point in time. By knowing the altitude or the power requirements, control system 134 may determine the power output requirement of generator 106, and in turn determine the amount of power that must be generated by the gas turbine engine 100. This information may be used by the control system 134 to control the supercharger 108 such that the gas turbine engine 100 is sufficiently supercharged to generate the necessary amount of power. The cooling air demand regulating system 138 may provide information to the control system 134 regarding the aircraft's demand for cooling air at a given time. This information may also be used by the control system 134 to control the supercharger 108 such that the load compressor 104 receives a sufficient amount of compressed air to supply the air conditioning and other cooling systems that may be on board the aircraft.

The procedure by which the control system 134 may control the supercharger 108 will now be explained in further detail. The control system 134 may be designed to advantageously use the "balanced" design of a gas turbine engine such as gas turbine engine 100. Gas turbine engines are typically balanced by design, such that they operate with the same atmospheric pressure at the engine exhaust as at the air intake. Thus, as altitude increases and the ambient air pressure decreases, the control system 134 may adjust the backpressure of gas turbine engine 100 to compensate for the pressure decrease. Specifically, the control system 134 may cause the VAN 114 to close or partially close, which will reduce the cross section of the exhaust outlet of the power recovery turbine 100 and cause an increase in backpressure, accordingly. The backpressure may be increased to the level of backpressure that is normally experienced at sea level, by closing the VAN 114 an appropriate amount. This amount may be pre-determined based on altitude and pressure values, and programmed into the control system 134. The control system 134 may be designed to produce the increase in backpressure at a threshold altitude or at a series of threshold altitudes, which may be determined by the system designer. The increased backpressure may also be initiated based on readings received from pressure sensors 138 and 140. The control system may utilize algorithms to determine the ratio of altitude to pressure, and activate the VAN 114 at certain threshold ratios. Appropriate timing, based on altitude and pressure ratios, may be determined by a system designer who is skilled in the art, and programmed in the control system 134.

Once the VAN 114 is activated, the increased backpressure at the exhaust of the gas turbine engine 100 will result in a pressure drop between the exhaust outlet of the gas turbine engine 100 and the power recovery turbine 112. This pressure differential will create a vacuum, causing exhaust from the gas turbine engine 100 to flow through and activate the power recovery turbine 112. Driven by the power recovery turbine 112, the supercharger compressor 108 may augment air pressure at the air intake 128 of the gas turbine engine 100, such that it becomes equivalent to the increased backpressure at the exhaust outlet of the gas turbine engine 100. This procedure of increasing backpressure to sea level conditions, which instigates an increase in pressure at the air intake 128 such that the air intake 128 is also at sea level conditions, may enable the gas turbine engine 100 to receive the same constant flow of air mass flow per minute that it was designed to receive at sea level. It is to be understood that the gas turbine engine 100 may be any suitable gas turbine engine, and that the control system 134 may be programmed to achieve air mass flow conditions appropriate for whatever gas turbine engine is selected for a particular application.

Under control of the control system 134, the backpressure of the turbine engine 100 may be incrementally increased to approximate typical sea level backpressure conditions as the aircraft gains altitude. Controlling the VAN 114 to create sea level backpressure will in turn control the amount of exhaust that is directed to the power recovery turbine. This may be accomplished under control of the control system 134, described above. The increase in backpressure at each increment may instigate or augment compressor and turbine stages of supercharger compressor 108, to supercharge the gas turbine engine 100. In this manner, i.e. by increasing the amount of exhaust the power recovery turbine 112 it receives from gas turbine engine 100, the power recovery turbine 112 may be controlled. The control system 134 may variably apply the incremental compressor and turbine stages of the supercharger compressor 108 to the gas turbine engine 100, adding more and more air volumetrically while producing additional power by use of the power recovery turbine 112. When power recovery turbine 112 is not in use, such as at sea level, it can be removed from operation of the overall system such as by the bypass duct 118.

Actuating the VAN 114 from full open, to closure in stages, may be the principal means by which power for power recovery turbine 112 is controlled. Closing the VAN 114 produces greater backpressure and thus more power, opening the VAN 114 reduces backpressure and the resultant power. As an aircraft climbs and altitude increases, the VAN 114 may progressively close, which would impose increased backpressure or resistance to the exhaust gas flow from the engine. This in turn would cause a pressure drop from the engine exhaust outlet to the power recovery turbine exit. As explained above, the pressure drop would create a vacuum effect, which would draw exhaust through the power recovery turbine 112. When the IGV 109 are open or partially open, power recovery turbine 112 may drive supercharger compressor 108 to generate additional air for the gas turbine engine's air intake 128. By appropriate scheduling according to altitude and air mass flow conditions, algorithms for which may be programmed into control system 134, the pressure at the engine exit can be maintained at sea level conditions or incrementally adjusted to sea level conditions, providing incremental pressure drops for the power recovery turbine 112 to produce incrementally larger amounts of power from the remainder of the energy available at a particular altitude.

In another exemplary embodiment, the power recovery turbine 112 may comprise a two-stage design. For a two-stage power recovery turbine, both stage nozzles may be VANs for maintaining more favorable pressure drops through the stages and, thus, better overall turbine efficiency. The two VANs may be coupled or individually controlled. Input pressure at high altitude may be sensed by a transducer and sent to the control system 134. The control system 134 may then open or close the variable area nozzles by pre-programmed amounts, selected as a function of altitude. Because the goal is to keep the engine inlet conditions similar or equivalent to sea level conditions, control logic of the control system 134 may include the coupling effect of the power recovery turbine 112 and its influence on the gas turbine engine's backpressure and power.

In an exemplary embodiment of the control system 134, control algorithms based upon pre-determined altitude conditions may be programmed in the control logic to adjust VAN 114 (or a combination of two VANs) in relation to altitude. The control logic may be implemented according to the algorithms in order to engage supercharger compressor 108 sufficiently to maintain sea level inlet conditions of gas turbine engine 100. An example of such conditions for the control logic is provided below. However, it is to be understood that these conditions and instructions may be modified as appropriate to ensure satisfactory operations of the system.

In the exemplary scenario, at sea level altitude the IGV 109 may be fully closed, and first and second variable area nozzles may be fully opened. The gas turbine engine 100 and the load compressor 104 may be fed through the bypass duct 118 as the gas turbine engine 100 operates at sea level conditions. At 10,000 feet, the IGV 109 may remain fully closed. The first VAN may be partially closed, keeping sea level conditions at the gas turbine engine exit. The power recovery turbine 112 produces partial power, and the gas turbine engine 100 operates at nearly full load. At approximately 15,000 to 20,000 feet, the IGV 109 may open partially. The first VAN may close further, and the second VAN may also partially close, creating sea level conditions at the engine exit. The supercharger compressor 108 may begin to operate, circulating gas through the intercooler 142 to the gas turbine engine 100 and the load compressor 104. The power recovery turbine 112 produces partial power. At 20,000 feet, the IGV 109 may fully open. The first VAN may be sufficiently closed to produce sea level conditions at the gas turbine engine exit, and the system may be fully operational at this point. Between 20,000 and 40,000 feet, the system may be fully operational. During this altitude range, the second VAN may progressively close to maintain the optimum pressure drop through the power recovery turbine 112. Again, it is to be understood that the conditions and instructions described above may be modified as appropriate to ensure satisfactory operations of the system, and that the teachings of control system 134 herein are not to be limited to the exemplary control logic instructions provided.

The exemplary control system embodiment described above may be implemented in a variety of system layout designs. As will be recognized by those skilled in the art, changes may be made to the particular examples provided in the foregoing descriptions when constructing a system according to the teachings herein. For example, the supercharger compressor 108 may be downsized to need, producing only sufficient air to supercharge the engine itself. Alternatively, it may be upsized where unabsorbed power produced by an added power recovery turbine 112 is re-directed to the gas turbine engine's primary power output shaft by coupling the power recovery turbine 112 to the gas turbine engine 100 itself. The power recovery turbine 112 and the supercharger compressor 108 may be allowed to "wind mill" with only a minor power penalty. Alternatively, the power recovery turbine 112 may be uncoupled by means of a clutch enabling it to uncouple from the gas turbine engine 100 at low altitudes. When the power recovery turbine 112 is not in use, it can also be bypassed by ducting such as exhaust duct 118. Various system layout designs may utilize a gas turbine engine in a turbo-shaft configuration to provide power required for the generator 106 and/or load compressor 104. The gas turbine engine 100, a turbine engine, may be either specifically designed for a particular application, or may comprise a COTS turbine engine. The power recovery turbine 112 may be a low pressure turbine, the supercharger compressor 108 may be a low pressure compressor, and the load compressor 104 may be a high pressure compressor. These turbines and compressors may be arranged in various configurations with an intercooler and electrical generator to meet specific systems application requirements at varying high altitudes.

Figure 2:
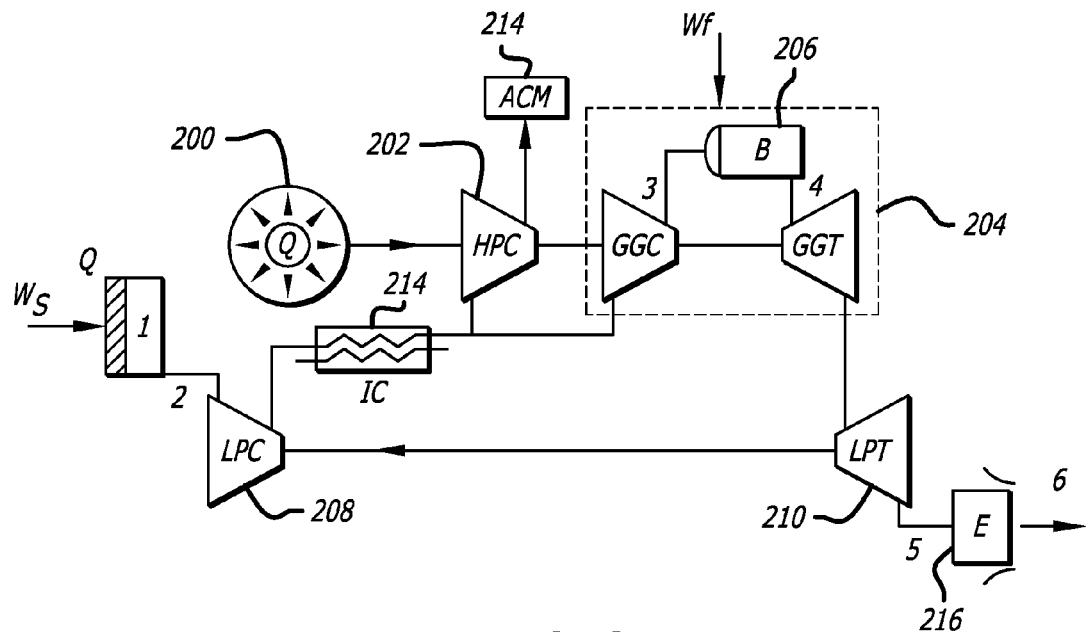
FIG. 2 is a schematic illustrating aspects of the first system layout design illustrated in FIG. 1.

FIG. 2 is a schematic illustrating aspects of the system layout design illustrated in FIG. 1. A generator 200 and a high pressure compressor ("HPC") 202 may be driven by a turbo shaft gas turbine engine 204. A gearbox 206, included with the gas turbine engine 204, may be used to provide optimum revolutions per minute ("rpm") for either the generator 200 or the HPC 202. A supercharger low pressure compressor ("LPC") 208 may be driven on a separate shaft by a power recovery low pressure turbine ("LPT") 210. The LPT 210 may receive full exhaust from the gas turbine engine 204. An intercooler 212 may provide cooler inlet temperature air for the gas turbine engine 204, thereby increasing its power capability and efficiency. Air may enter the LPC 208, pass through the intercooler 212 and then split to supply both the gas turbine engine 204 and the HPC 202. Compressed air from the HPC 202 may be discharged to air conditioning equipment 214. Air leaving the gas turbine engine 204 may pass through the LPT 210, which in turn may drive the supercharging LPC 208. The LPT exhaust gas is then discharged to ambient, as illustrated at 216.

Figure 3:
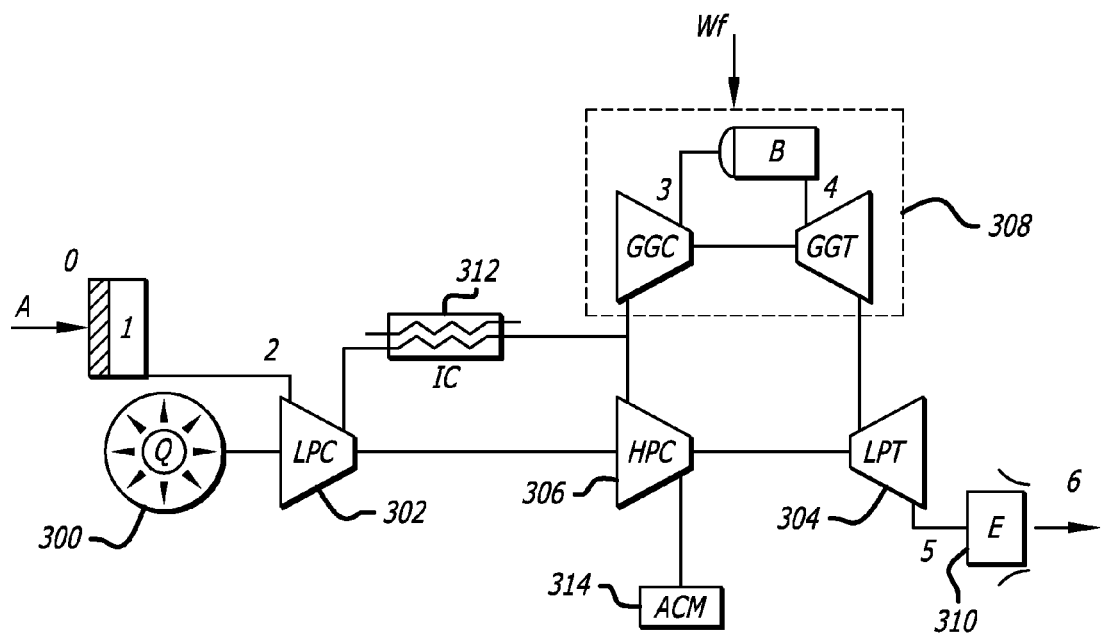
FIG. 3 is a schematic illustrating a first alternative system layout design.

FIG. 3 is a schematic illustrating a first alternative system layout design. In this configuration, a generator 300, LPC 302, LPT 304 and HPC 306 may all be on a low-pressure spool and driven by the turbine engine exhaust gas from a gas turbine engine 308. The gas turbine engine 308 may supply the LPT 304 with high pressure and high temperature exhaust gas. Thus, the LPT may provide a moderate to high load driving the generator 300 and the two compressors 302 and 306. LPT exhaust gas may be discharged to ambient, as illustrated at 310. An intercooler 312 may cool air produced by the LPC 302. Cooled air from the intercooler 310 may then split to produce air intake for the gas turbine engine 308, and compressed air, from the HPC 306, for air conditioning equipment 314.

Figure 4:
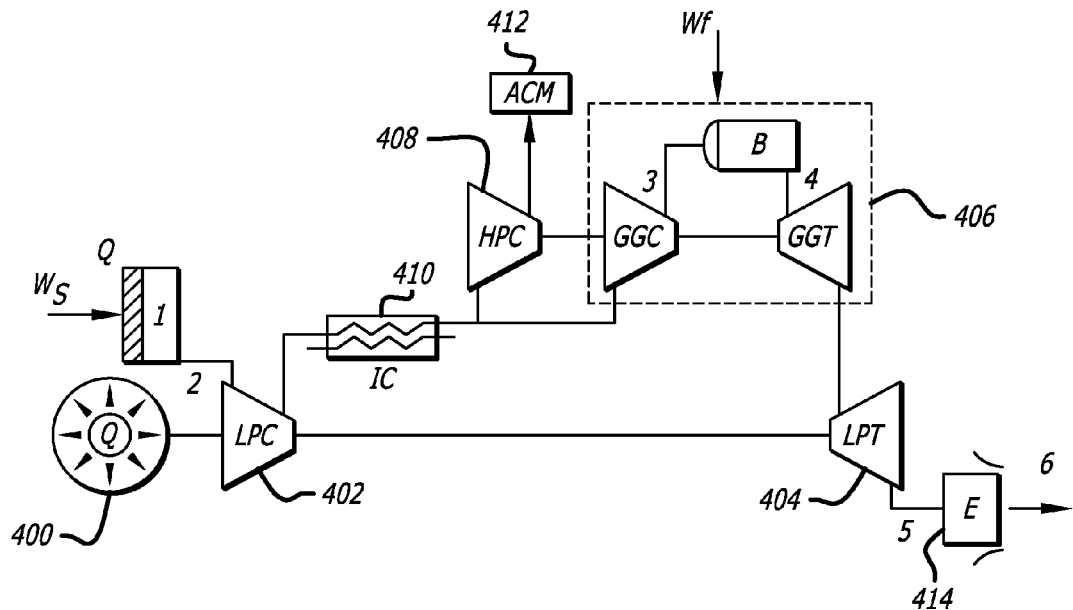
FIG. 4 is a schematic illustrating a second alternative system layout design.

FIG. 4 is a schematic illustrating a second alternative system layout design. In this configuration, a generator 400, LPC 402 and LPT 404 may again be on a low-pressure spool and driven by the turbine engine exhaust gas from gas turbine engine 406. However, a HPC 408 may be on the gas turbine engine shaft. Gas from a gas turbine engine 406 may drive the generator 400 and the LPC 402 on the low pressure spool. Air from the LPC 402 may pass through an intercooler 410 and then split to supply both the gas turbine engine 406 and the HPC 408. Compressed air from the HPC 408 may be discharged to air conditioning equipment 412. Air leaving the gas turbine engine 406 may pass through the LPT 404, which in turn may drive the supercharging LPC 402. LPT exhaust gas is then discharged to ambient, as illustrated at 414.

Figure 5:
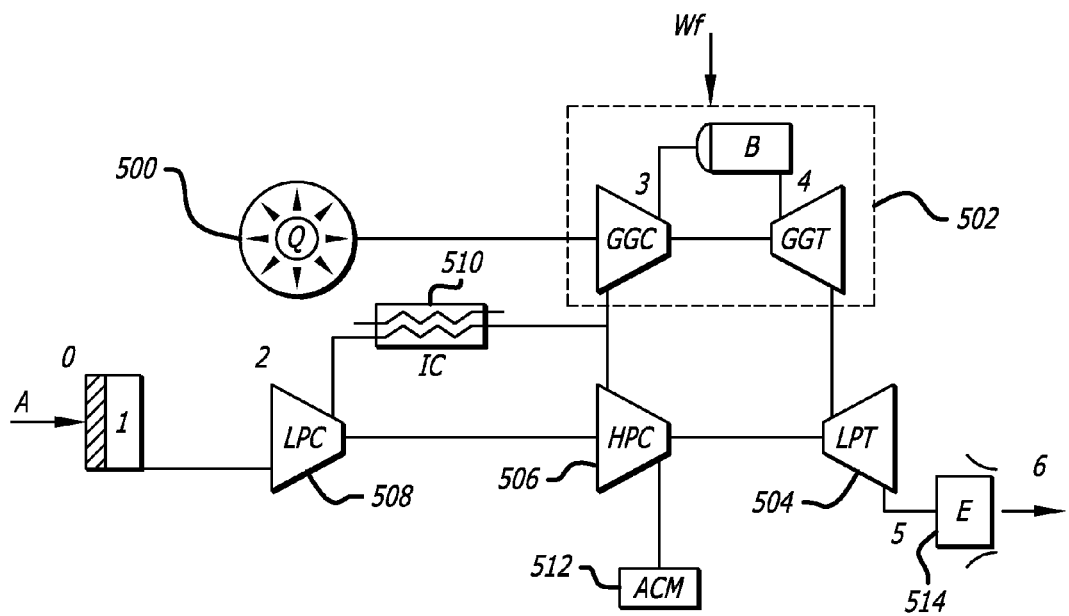
FIG. 5 is a schematic illustrating a third alternative system layout design.

FIG. 5 is a schematic illustrating a third alternative system layout design. In this configuration, a generator 500 may be placed on the shaft of a gas turbine engine 502. LPT 504 may drive HPC 506 and LPC 508 on the low pressure spool. Air from the LPC 508 may pass through an intercooler 510 and then split to supply both the gas turbine engine 502 and the HPC 506. Compressed air from the HPC 506 may be discharged to air conditioning equipment 512. Air leaving the gas turbine engine 502 may pass through the LPT 504, which in turn may drive the supercharging LPC 508. LPT exhaust gas is then discharged to ambient, as illustrated at 514.

The previous description of the disclosed embodiments is provided to enable any person skilled in the art to make or use the teachings herein. Various modifications to these embodiments will be readily apparent to those skilled in the art, and the generic principles defined herein may be applied to other embodiments without departing from the spirit or scope of the teachings disclosed herein. Thus, the scope of the disclosures herein is not intended to be limited to the embodiments shown and described, but is to be accorded the widest scope consistent with the general principles and novel features disclosed herein.

What is claimed is:

1. A gas turbine power system for an aircraft, comprising:
   a gas turbine engine having a sensor system configured to determine the air mass flow through though the engine, and an exhaust nozzle having a variable opening;
   a control system configured to adjust the variable opening, as a function of the air mass flow, to maintain approximately sea level back pressure;
   a power recovery turbine coupled to the variable opening in the gas turbine engine;
   a first compressor driven by the power recovery turbine, and configured to deliver compressed air to the gas turbine engine; and
   a second compressor coupled to the gas turbine engine or the power recovery turbine.

2. The gas turbine power system of claim 1 wherein the sensor system comprises at least one pressure sensor.

3. The gas turbine power system of claim 1 further comprising an exhaust duct coupled between the variable opening and the power recovery turbine, wherein the sensor system comprises a first pressure sensor located adjacent to an air intake of the gas turbine engine, and a second pressure sensor located in the exhaust duct adjacent to the variable opening.

4. The gas turbine power system of claim 1 wherein the control system is further configured receive a signal indicative of the altitude of the aircraft, and adjust the variable opening, as a function of the air mass flow and the altitude, to maintain approximately sea level back pressure.

5. The gas turbine power system of claim 4 further comprising inlet guide vanes coupled to the first compressor and configured to control the amount of air that enters the first compressor, wherein the control system is further configured to adjust, as a function of the air mass flow and the altitude, the position of the inlet guide vanes.

6. The gas turbine power system of claim 3 wherein the exhaust duct comprises a bypass duct configured to release exhaust from the gas turbine engine that is not directed into the power recovery turbine.

7. The gas turbine power system of claim 1 further comprising an air intercooler coupled between the first compressor and an air intake of the gas turbine engine.

8. The gas turbine power system of claim 7 further comprising an air conditioning system coupled to the second compressor.

9. The gas turbine power system of claim 1 further comprising a clutch coupled between, and configured to engage and disengage, the gas turbine engine and the power recovery turbine.

10. A gas turbine power system for an aircraft, comprising:
   a gas turbine engine having an exhaust nozzle with a variable opening;
   means for determining the air mass flow through the gas turbine engine;
   means for variably opening the exhaust nozzle, as a function of the air mass flow, to maintain approximately sea level back pressure;
   means for converting exhaust from the exhaust nozzle to mechanical power;
   first means for compressing air for delivery to the gas turbine engine, said first means for compressing air being driven by the mechanical power produced by the exhaust from the gas turbine engine; and
   second means for compressing air for delivery to a remote cooling system, said second means for compressing air being driven by the gas turbine engine or the mechanical power produced by the exhaust from the gas turbine engine.

11. A gas turbine power system for an aircraft, comprising:
   a gas turbine engine having a sensor system configured to determine the air mass flow through the engine, and an exhaust nozzle having a variable opening;
   a control system configured to adjust the variable opening to maintain a relatively constant air mass flow through the engine as the aircraft ascends;
   a power recovery turbine coupled to the variable opening in the gas turbine engine;
   a first compressor driven by the power recovery turbine, and configured to deliver compressed air to the gas turbine engine; and
   a second compressor driven by the gas turbine engine or the power recovery turbine.

12. The gas turbine power system of claim 11 wherein the relatively constant air mass flow through the engine is maintained by the control system by reducing the variable opening of the exhaust nozzle as the aircraft ascends.

13. The gas turbine power system of claim 12 wherein the control system is further configured to reduce the variable opening of the exhaust nozzle as the aircraft ascends to maintain approximately sea level back pressure.

14. The gas turbine power system of claim 11 wherein the control system is further configured to receive a signal indicative of the altitude of the aircraft, and adjust the variable opening of the exhaust nozzle, as a function of the altitude, to maintain the relatively constant air mass flow through the engine.

15. The gas turbine power system of claim 14 wherein the control system is further configured to maintain the relatively constant air mass flow through the engine by reducing the variable opening of the nozzle a certain amount as the aircraft ascends for each of one or more altitude thresholds.

16. The gas turbine power system of claim 14 further comprising inlet guide vanes coupled to the first compressor and configured to control the amount of air that enters the first compressor, wherein the control system is further configured to adjust, as a function of the air mass flow and the altitude, the position of the inlet guide vanes.

* * * * *